April 22, 1924.
E. S. EVANS
1,491,595
MOTOR VEHICLE TRANSPORTING BOX
Filed Aug. 8, 1922
2 Sheets-Sheet 1
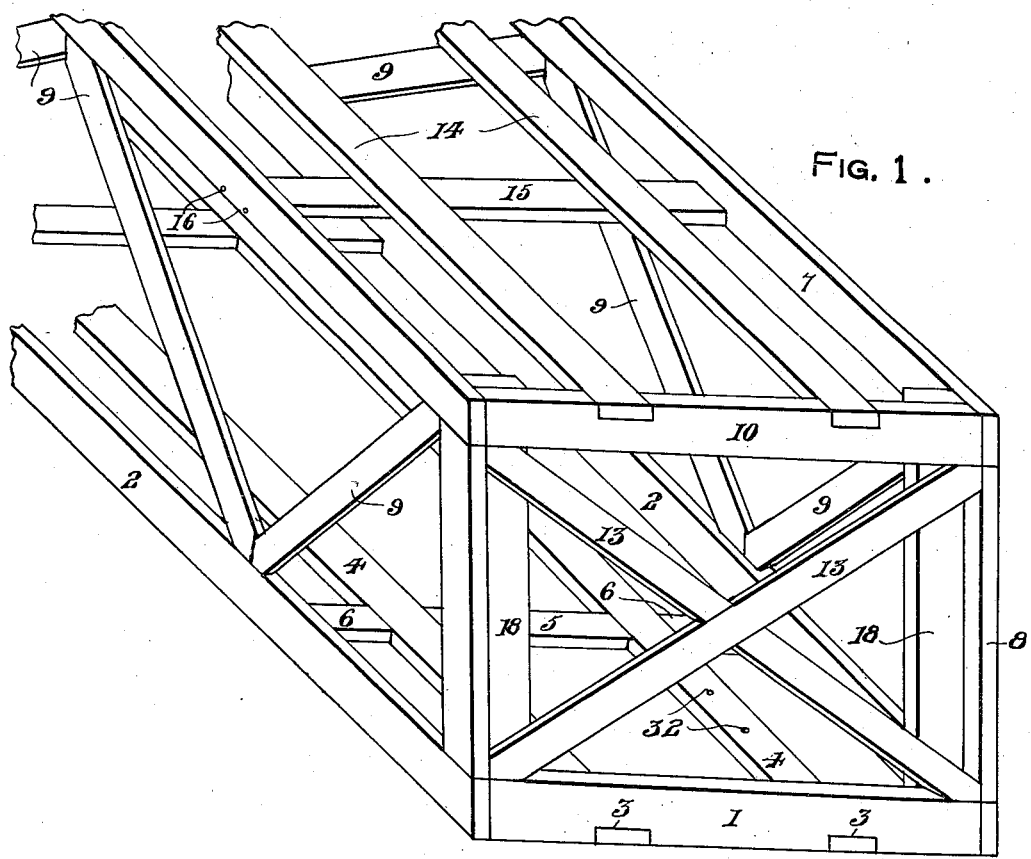
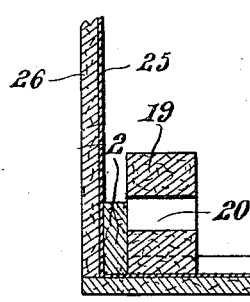
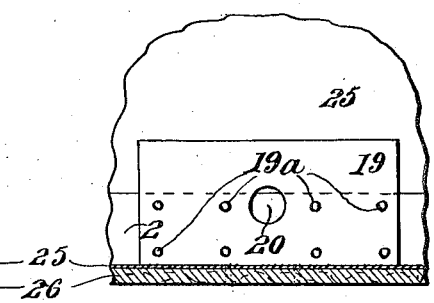
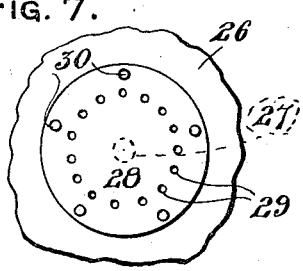
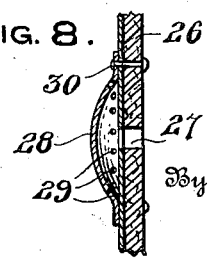
Inventor
Edward S. Evans
By J. K. Bryant,
Attorney.

April 22, 1924.
E. S. EVANS
1,491,595
MOTOR VEHICLE TRANSPORTING BOX
Filed Aug. 8 1922
2 Sheets-Sheet 2
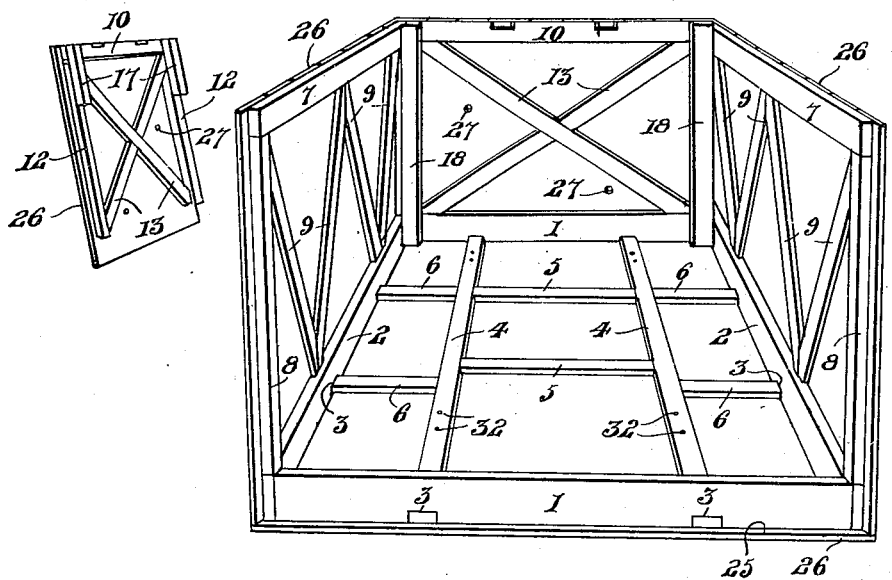
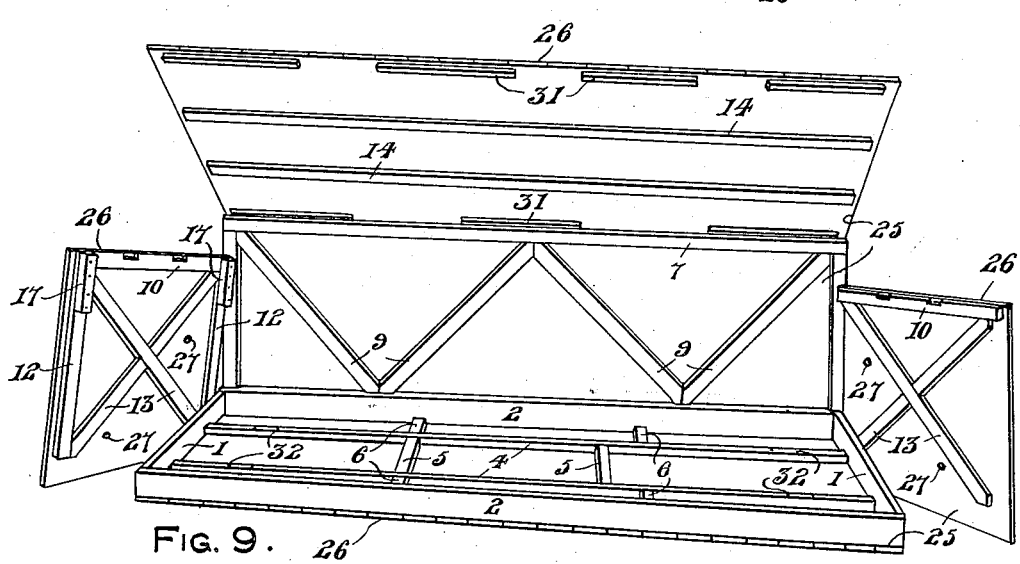
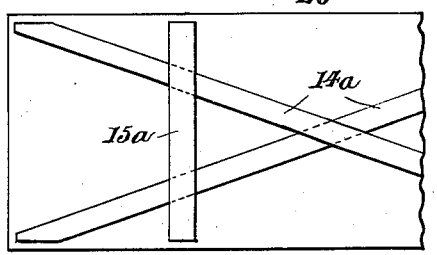
Inventor
Edward S. Evans
By F. K. Bryant,
Attorney Patented Apr. 22, 1924.

1,491,595

UNITED STATES PATENT OFFICE.

EDWARD S. EVANS, OF DETROIT, MICHIGAN, ASSIGNOR TO E. S. EVANS & CO., INC., OF DETROIT, MICHIGAN, A CORPORATION OF DELAWARE.

MOTOR-VEHICLE TRANSPORTING BOX.

Application filed August 8, 1922. Serial No. 580,430.

*To all whom it may concern:*

Be it known that I, EDWARD S. EVANS, a citizen of the United States of America, residing at Detroit, in the county of Wayne and State of Michigan, have invented certain new and useful Improvements in Motor-Vehicle Transporting Boxes, of which the following is a specification.

This invention relates to certain new and useful improvements in motor vehicle transporting boxes and has particular reference to a box structure or crate for encasing a motor vehicle during transportation or shipment thereof and is especially designed either for domestic or export use.

The invention has for its primary object, the provision of a box for shipping or transporting motor vehicles, the box being peculiarly designed for increasing the efficiency and strength thereof, decreasing the weight by approximately 200 pounds when compared with shipping boxes of a similar nature, consequently noting a considerable saving in material, rendering the box less expense to manufacture, and by actual test, producing a shipping box or crate for motor vehicles that possesses at least twenty-five per cent greater strength than similar boxes.

The box embodies a skeleton frame work formed of independent top, bottom, end and side walls having suitable bracing or truss bars combined and associated in a manner for increasing the strength of the box and at the same time materially decreasing the weight thereof.

A further object of the invention is to provide a waterproof and perfectly ventilated shipping or transporting box for motor vehicles wherein the skeleton frame work of the box has the several wall sections forming the same covered with paper with wooden sheathing disposed upon the paper covering, the end walls of the box having openings therein that are covered by ventilating plates permitting the free circulation of air through the box, but preventing the entrance of water or moisture therein.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a fragmentary perspective view of the skeleton frame work of the motor vehicle transporting box constructed in accordance with the present invention, Figure 2 is a perspective view of the box showing the cover and one end wall removed, Figure 3 is a perspective view of the box with one side wall removed, the end walls and cover detached with the perpendicular bracing strip and securing block for one end wall removed, Figure 4 is a perspective view of one of the end walls, Figure 5 is a detail sectional view showing the paper lining and piecing covering for the skeleton frame work with an apertured bearing block for receiving the end of the automobile axle mounted upon a side rail of the box bottom, Figure 6 is a detail sectional view showing the axle supporting block anchored to a side rail of the box bottom, Figure 7 is a fragmentary elevational view of one end of the box showing the metallic ventilating plate covering an opening in the end wall of the box, and Figure 8 is a sectional view of the end wall of the box and ventilating plate shown in Fig. 7 illustrating the manner of anchoring the ventilating plate to the end wall of the box.

The present applicant specializing in the manufacture and construction of boxes or crates for the transporting of motor vehicles, and further being an expert in the loading of automobiles, has designed and actually reduced to practice, the type of shipping box disclosed in this application, bearing in mind the saving of material with a consequent reduction in weight and constructing the box in a manner to increase the strength thereof and insure a considerable saving in the expense of manufacture. The box is formed from a skeleton framework embodying a top, bottom, end and side walls that are adapted to be secured together as by nailing or otherwise for completely encasing a motor vehicle during shipment thereof, the skeleton framework being covered by a waterproof paper that has superposed thereon wood sheathing, while ventilating devices are preferably associated with each end wall thereof.

Referring more in detail to the accompanying drawings, there is illustrated a box for transporting or shipping motor vehicles, the bottom section or wall embodying end rails 1 and side rails 2, said rails being preferably formed of 2" by 6" material having their major transverse axes extending perpendicularly to form a rectangular frame. The lower edges of the side and end rails 1 and 2 are mortised as at 3 for the reception of the ends of spaced longitudinally extending brace bars 4 preferably formed of 2" by 4" material, cross braces 5 extending between the brace bars 4, while cross braces 6 extend between the brace bars 4 and the opposite side rails 2. In constructing the bottom of the box, the longitudinally extending brace bar 4 and the cross braces 5 and 6 are suitably positioned to provide proper clearances for the adjacent portions of the motor vehicle to be supported thereby.

The side-walls are of identical construction, each embodying an upper rail 7, a perpendicular corner bar 8 depending from each end of the upper rail 7 while pairs of V-shaped brace bars or struts 9 are positioned between the end bars 8 and beneath the upper rail 7.

The end wall embodies an upper rail 10 mortised as at 11 at the upper edge thereof, perpendicular corner bars 12 depending from the upper rail 10 while crossed brace bars or struts 13 extend between the corner bars 12 and the opposite ends of the upper rail 10 as clearly shown in Figs. 3 and 4.

The cover section shown in Fig. 1 embodies longitudinally depending spaced brace bars 14 having their ends received in the mortised portions 11 of the upper rails 10 of the end wall, while one or more cross braces 15 extend between the upper rails 7 of the side walls and are suitably anchored therein by securing devices 16 as shown in Fig. 1. When the sections of the box are assembled as shown in Fig. 1, it being noted that the perpendicular corner bars 12 of the end walls are secured to the upper rails 10 by the relatively short blocks 17, and it being further noted that the combined thicknesses of the corner bars 12 and securing blocks 17 are equal to the thickness of the end rails 1 of the bottom walls, corner brace bars 18 are positioned within the box as shown in Figs. 1 and 2 and are suitably connected to the upper rails 10 of the end walls and the end rails 1 of the bottom wall.

As shown more clearly in Figs. 5 and 6, blocks 19 are secured as at 19ᵃ to the inner faces of each side rail 2 of the bottom wall, each block having an opening 20 therein for supporting the axle of an automobile. With a motor vehicle so supported the same is further braced within the box by shackle bolts or the like inclosing the vehicle axles and extending through the openings 32 in the longitudinal brace bar 4.

When the several sections are assembled as shown in Fig. 1, the same are covered with waterproof paper 25, while board sheathing preferably 1" by 6" material denoted by the reference numeral 26 is superposed upon the paper covering and nailed to the skeleton frame structure. The wood sheathing 26 completely encases the skeleton box structure and adds to the strength and reinforcement thereof, permitting the exclusion of superfluous angle or truss bars or braces in the skeleton box structure to reduce the entire weight of the completed box and materially increasing the strength thereof.

To provide for a thorough ventilation or circulation of air through the box, the end walls thereof are provided with openings 27 while an arched metallic disk 28 provided with a plurality of concentrically arranged openings 29 is secured as at 30 to the end wall and overlies the opening 27, permitting a free circulation of air and preventing the entrance of water or moisture to the interior of the box.

If desired, the several sections forming the box may be constructed of complete units, i. e., each section will include the skeleton frame structure, the waterproof paper covering 25, and the wood sheathing 26 so that when the sections are assembled, the entire box or crate will be fabricated. Should it be desired to ship two motor vehicles in a single crate, the top wall may be eliminated, and two bottom walls employed in connection with the side and end walls.

As above stated, one of the principal objects of this invention is to construct a box for shipping or transporting motor vehicles wherein the box is materially reduced in weight with a consequent saving of material in the construction thereof, and also with a view of increasing the strength of the box. This type of box is now being employed in encasing motor vehicles in the transportation thereof, noting a considerable financial saving to the manufacturer shipping the same, represented by a reduction in cost of lumber, labor, and domestic and foreign freight.

The type of box cover shown in Fig. 3 is of slightly modified construction, the same being provided with the spaced longitudinally extending brace bars 14, while spaced relatively short cleats 31 extend parallel with each edge of the cover and if desired, the cross braces 15 associated with the cover may be employed. Another form of cover is shown in Figures 9 and 10, wherein longitudinally extending crossed brace bars 14a have cross or transverse braces 15a secured thereto, the frame structure being carried by the board sheathing 26 with an interposed sheet of waterproof paper 25.

While there are herein shown and described the preferred embodiments of the present invention it is nevertheless to be understood that minor changes may be made therein without departing from the spirit and scope of the invention as claimed, it being noted that the wheels of the automobile may either be secured to the inner faces of the side walls of the box, or shipped separately with the tops.

What is claimed as new is:—

1. In a transporting box for motor vehicles, a box formed of sections of skeleton formation with the bottom section of the box supporting the side and end sections, a waterproof covering for the skeleton box and wood sheathing overlying the waterproof covering and secured to the walls of the box.

2. In a transporting box for motor vehicles, a box formed of sections of skeleton formation with the bottom section of the box supporting the side and end sections, longitudinal and transverse brace bars carried by the bottom section, a waterproof covering for the skeleton box and wood sheathing overlying the water-proof covering and secured to the walls of the box.

3. In a transporting box for motor vehicles, a box formed of sections of skeleton formation with the bottom section of the box supporting the side and end sections, reinforcing corner posts secured within the box, a waterproof covering for the skeleton box and wood sheathing overlying the waterproof covering and secured to the walls of the box.

4. In a transporting box for motor vehicles, a box formed of sections of skeleton formation with the bottom section of the box supporting the side and end sections, longitudinal and transverse brace bars carried by the bottom section, reinforcing corner posts secured within the box, a waterproof covering for the skeleton box and wood sheathing overlying the water-proof covering and secured to the walls of the box.

5. In a transporting box for motor vehicles, a box formed of sections secured together, each section embodying a skeleton frame having brace bars, and a waterproof covering and wood sheathing covering for the box.

6. In a transporting box for motor vehicles, wherein the same embodies a skeleton frame structure, a waterproof covering and wood sheathing superposed thereon, said box being fabricated in units consisting of completely preformed sides, a top, a bottom and ends.

7. In a transporting box for motor vehicles, wherein the same embodies a skeleton frame structure, a waterproof covering and wood sheathing superposed thereon, said box being fabricated in units consisting of completely preformed sides, a top, a bottom and ends, and perpendicular corner brace bars secured within the box.

8. In a transporting box for motor vehicles, wherein the same embodies a skeleton frame structure, a waterproof covering and wood sheathing superposed thereon, said box being fabricated in units consisting of completely preformed sides, a top, a bottom and ends, said top embodying spaced longitudinally extending brace bars and relatively short cleats positioned adjacent the edges thereof.

9. In a transporting box for motor vehicles, wherein the same embodies a skeleton frame structure, a waterproof covering and wood sheathing superposed thereon, said box being fabricated in units consisting of completely preformed sides, a top, a bottom and ends, said top embodying longitudinally extending crossed brace bars and spaced transverse brace bars.

10. In a transporting box for motor vehicles, wherein the same embodies a frame structure, a waterproof covering and wood sheathing superimposed thereon, said box being fabricated in units consisting of preformed sides, top, bottom and ends, said bottom embodying longitudinally extending spaced brace bars and transverse spaced brace bars, the sides, ends and top having diagonal bracing and said box being further braced at the corners by perpendicular corner brace bars secured to all of the main converging frame members.

In testimony whereof I affix my signature.

EDWARD S. EVANS.